Aug. 15, 1961 H. J. JOHN 2,996,294
MERCURY WASHER
Filed March 17, 1959

INVENTOR
HARRY J. JOHN

BY R. Hoffman.
ATTORNEY 2,996,294
MERCURY WASHER
Harry J. John, 809 Glendalough Road,
Philadelphia 18, Pa.
Filed Mar. 17, 1959, Ser. No. 800,062
1 Claim. (Cl. 266—34)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a washer employed in the cleaning of liquid mercury and has among its objects the removal of chemical and physical impurities from liquid mercury.

Liquid mercury is used in many types of laboratory apparatus such as manometers or systems for measuring volumes of gases evolved or consumed in chemical reactions. The mercury often becomes contaminated with chemicals and with dust and other foreign particles and, for accurate functioning of the apparatus, must be replaced with clean mercury. Mercury is expensive, so it is desirable to recover and reuse the mercury withdrawn from equipment. Washing the mercury in a beaker or other open vessel is inefficient because of the limited exposure of surface of the mercury to the washing medium at any one moment. Glass funnels with the stem pulled out to a fine capillary, with or without a punctured filter paper in the funnel, are often used, but the operation is slow, only a portion of the dirt and amalgam adhere to the paper or the wall of the funnel, and solid particles plug the capillary.

The mercury washer of this invention is now described with reference to the accompanying drawing.

Figure 1:
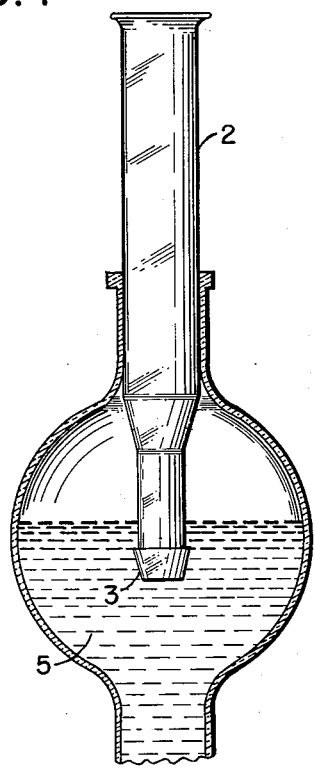
Figure 2:
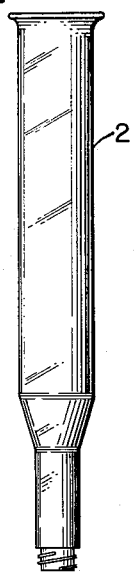
Figure 3:
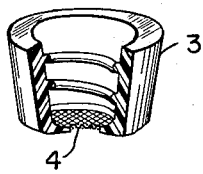
Figure 3:
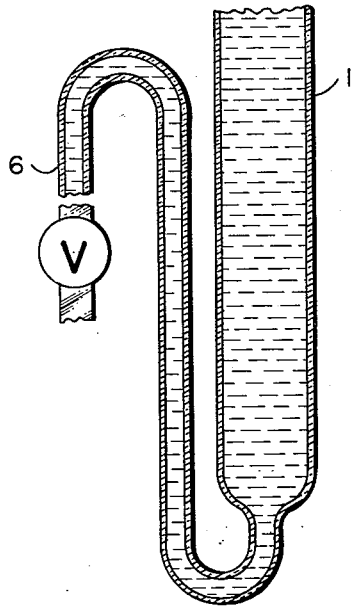

FIGURE 1 shows tube 1, a vessel containing an aqueous medium for washing the mercury, and tube 2, a tube containing the fine screen through which the mercury enters the aqueous medium, assembled for operation, the respective tubes being supported by appropriate means. Tube 2, preferably made of glass or other material inert to mercury, is a tube open at both ends, one end being threaded, as shown in FIG. 2, to receive a reciprocally threaded retaining ring 3. The screen 4, preferably about 200 mesh and made of stainless steel wire, is placed in the retaining ring 3, as depicted in FIG. 3, and ring 3 is screwed on to the threaded end of tube 2 until the screen is held firmly in place.

An essential feature in operation of the washer is that the mesh screen 4 be kept below the surface of the aqueous phase 5. Mercury passing through the screen in contact with the aqueous medium is dispersed in a fine cloud of mercury particles which collect in the bottom of tube 1. A valve 6 is affixed to tube 1 for convenient removal of mercury or of the aqueous phase being used for washing the mercury.

*Example*

In a typical operation of the mercury washer, tube 1, which was provided with an expanded, globe-like chamber at the level to which the bottom of tube 2 is inserted, was filled with 10% aqueous nitric acid to the level indicated for 5 in FIG. 1. Mercury from a Van Slyke apparatus was poured into the top of tube 2 and immediately began to pass through the 200 mesh screen (dimension of the approximately square opening was 0.004 inch on each side). In a tube of about ¾ inch in diameter and 8 inches high, with a screen of about ½ inch in diameter, the rate of flow of mercury was about one pound per minute. As the level of mercury in tube 2 falls, the rate of flow gradually decreases. A rather uniform rate of flow of the mercury may be maintained by applying slight positive air pressure to the surface of the mercury in tube 2.

The mercury was dispersed in the aqueous nitric acid. The acid reacted with the impurities to form water soluble salts which dissolved in the aqueous phase. The particles of mercury collected in the bottom of tube 1 and coalesced to form a liquid layer, which was then removed via valve 6. Usually one pass through the acid solution is sufficient, but if desirable the mercury may be recycled through the screen in the aqueous acid solution. After the mercury was removed from tube 1 the aqueous acid solution was removed and replaced with distilled water. The aqueous acid washed mercury was poured into tube 2, whereupon it passed through the screen, was dispersed in the distilled water, and was washed by the water as the very minute particles settled through the water.

The mercury obtained from this method of purification was clean and bright in appearance, gave accurate meniscus readings in laboratory apparatus, did not leave films on surface of apparatus, and contained no chemical contaminants to cause errors in determining volumes of gases.

By the use of the apparatus of this invention, contaminated mercury may be satisfactorily cleaned in the laboratory, thus saving time and expense incurred in sending the mercury to a factory for purification.

Screens of various mesh values were tried in this apparatus. The 200 mesh screen gave optimum results of efficient washing in a minimum amount of time.

I claim:

Apparatus for cleaning liquid mercury comprising a first vessel for holding a cleaning liquid; a second vessel for receiving mercury to be cleaned having an inlet end and an outlet end, said outlet end extending into said first vessel; a screen of about 200 mesh for dispersing mercury into a fine cloud when said screen is immersed beneath the surface of a cleaning liquid contained in said first vessel; and means for securing said screen to the outlet end of the second vessel.

References Cited in the file of this patent
UNITED STATES PATENTS

| | | |
|---|---|---|
| 1,386,227 | Becket | Aug. 21, 1921 |
| 1,707,471 | Remer | Apr. 2, 1929 |
| 2,032,602 | Stearns | Mar. 3, 1936 |
| 2,440,456 | Alley et al. | Apr. 27, 1948 |
| 2,469,418 | Striplin | May 10, 1949 |
| 2,572,489 | Jordan | Oct. 3, 1951 |
| 2,840,463 | Stroup et al. | June 24, 1958 |